Patented Mar. 22, 1938

2,111,912

UNITED STATES PATENT OFFICE 2,111,912

COLLOIDAL GOLD-CONTAINING CREAM

Thomas Govett, Elmhurst, N. Y.

No Drawing. Application October 19, 1935,
Serial No. 45,781

3 Claims. (Cl. 167—91)

This invention relates to the manufacture of toilet creams of the emulsion type, more particularly so-called cold creams, beauty creams, vanishing creams, skin lotions and the like and has for its particular objects the production of toilet creams of the above type which possess unusually curative properties when applied to the skin, non-irritating, even in the case of raw tissue, of an attractive color and do not stain the skin when applied thereto, besides other advantages as hereinafter set forth.

My investigations have led to the discovery that colloidal gold possesses certain highly desirable properties which render it peculiarly suitable for use as an ingredient of toilet creams of the emulsion type and more particularly because of its high germicidal value, its extremely fine particle size, which not only facilitates its homogeneous incorporation with such cream, but also its penetration into the pores of the skin, its stability and also because of the attractive color which it imparts to such cream.

The following examples are illustrative of my invention as applied to toilet creams, such for example as cold cream, vanishing cream and skin lotions.

I

Cold cream

| | Parts |
|---|---|
| Mineral oil | 130 |
| Bees wax | 35 |
| Borax | 3 |
| Water suspension of colloidal gold (0.047% gold content) | 55 |
| Perfume | 3 |

In the compounding of cold creams, the oil is heated above the melting point of the bees wax, preferably about 75° C., and the latter is then dissolved therein. Separately the borax is dissolved in a water suspension of colloidal gold while the water suspension is heated to approximately a boiling temperature sufficient to effect the solution of the borax, and then both mixtures are cooled to a temperature of between about 66° C. and 70° C., preferably just above the melting point of the bees wax, whereupon the borax is slowly added, with constant stirring, to the oil solution of bees wax. It is important that the two solutions when admixed should not be too hot, as otherwise the texture of the product is objectionably impaired. Furthermore, after cooling the resultant mixture below the melting point of bees wax, the mixture should not be again heated above such point, since, if so, some of the water phase containing colloidal gold in suspension will tend to separate out in the form of a marginal envelope around the body of the cream in the container in which it is packed and which aqueous de-emulsified ring can be poured off from the body of the cream. Such separation is, of course, highly objectionable.

Actual laboratory tests of this cold cream prepared in accordance with Formula No. 1, show that the addition of this cream to an agar broth imparted a decided germicidal action, viz., on ten minutes, exposure to the air at room temperature of an agar broth cold cream plate no bacteria colonies were found present in the plate, whereas under identical conditions of treatment a control plate containing no cold cream shows thirty colonies present. Similar tests at higher temperatures on agar broth cold cream plates show not only a very decided difference in the number of colonies of bacteria found present, but also in the structure of the bacteria which developed.

II

Vanishing cream

| | Parts |
|---|---|
| Stearic acid | 18 |
| Sodium hydroxide (2½% solution) | 36 |
| Water suspension of colloidal gold (0.047% gold content) | 40 |
| Perfume | 1 |

In compounding such vanishing creams, hot stearic acid and sodium hydroxide are mixed together and saponified in the customary manner by heating the same to an elevated temperature, preferably to about 85° C. and the water suspension of colloidal gold, preferably heated to about 85° C. is then slowly added with constant stirring to said soap solution. The resultant mixture is then slowly cooled with constant agitation to room temperature. The amount of stearic acid employed is several times the combining weight required to form a soap and the surplus stearic acid will be emulsified with the soap solution.

III

Skin lotions

| | Parts |
|---|---|
| Mineral oil | 35 |
| Bees wax | 2 |
| Tri-hydroxyethylamine stearate | 8 |
| Water | 25 |
| Water suspension of colloidal gold (0.047% gold content) | 25 |
| Perfume | 1 |

In compounding the aforesaid lotion, the mineral oil is heated above the melting point of the bees wax; beeswax and tri-hydroxyethylamine stearate are then incorporated therein with constant stirring. The resultant mixture is then cooled to between 66° C. and 70° C. and the water suspension of colloidal gold previously diluted with the additional water, and also heated to a temperature between 66° C. and 70° C. is then slowly added, with constant stirring, to the wax solution.

The function of the tri-hydroxyethylamine stearate is that of an emulsifying agent, its presence being highly desirable in the case of a lotion, as it tends to effectively stabilize the emulsion and more effectively prevent separation of the two phases thereof.

IV

Beauty cream

| | Parts |
|---|---|
| Oil (petrolatum) | 30 |
| Oxychloresterin | 10 |
| Water suspension of colloidal gold (0.047% gold content) | 20 |
| Water | 10 |
| Perfume | 1 |

In compounding the above beauty cream, the petrolatum is first melted, being heated to about 60° C., the oxychloresterin, which is the active principle of lanolin, is then mixed therewith and then the colloidal gold suspension previously diluted with the additional water and also heated to about 60° C. is slowly added, with constant stirring, to the first mixture.

The perfume ingredient in each of the above products, is desirably incorporated therewith toward the end of the manufacturing operation, but while the product is still being vigorously stirred in order to minimize the loss of such perfume due to volatilization.

The toilet creams of Formulae 1 to 3 are types of what are commonly known as oil-in-water emulsions wherein the water exists in the external phase, whereas the beauty cream of Formula 4 is a type of water-in-oil emulsion in which the oil exists in the external phase.

The water employed in producing the aforesaid creams and lotions should be pure or distilled water, as the gold suspension and the character of the emulsion are both deleteriously affected by the salts normally present in ordinary water. Moreover, in compounding the aforesaid creams and lotions, the mixtures should be constantly agitated so that the temperature drop will be gradual, and once the wax or fatty acid ingredient of any such products has hardened, it should not be re-melted since thereby the emulsion will be disturbed or upset and the water phase containing the gold suspension, especially in those products wherein the emulsion is of the oil-in-water type, will tend to separate and, due to its intense color, impart an unsightly appearance to such creams or lotions.

My improved toilet creams possess an unusually attractive rose-pink color which is imparted thereto by the colloidal gold which is of itself highly colored and therefore possesses a strong tinctorial property. Moreover, because of the extremely fine particle size of the gold present in the creams, this ingredient is capable of penetrating deeply into the pores of the skin and consequently, due to its high germicidal value, the creams or lotions containing this ingredient have a remarkable curative or healing action and are otherwise capable of definitely improving the skin. Furthermore, there is no tendency for the colloidal gold to precipitate in and thereby clog the pores of the skin nor does the colloidal gold in any way tend to stain the skin as do precious metal salts, which also possess a high germicidal value, such for example as silver nitrate.

The amount of alkali employed in effecting the emulsion of the waxes, in the case of cold cream, or the fatty acids, in the case of vanishing creams, is relatively small, being considerably less than the combining weight thereof.

In the case of vanishing creams, the amount of sodium hydroxide employed is preferably less than one-half of the amount required to saponify the stearic acid.

Preferably the amount of colloidal gold incorporated in the cream exceeds .005% by weight and is less than .035%, but the germicidal index of colloidal gold is so high that even if present in much smaller quantities than the minimum above specified, the germicidal properties of the creams and lotions are materially enhanced thereby.

It is to be understood that the various formulae herein set forth are given merely illustrative of the various types of toilet creams to which my invention is applicable and that without departing from the spirit of my invention, as embraced within the scope of the appended claims, the ingredients and proportions of the toilet creams as set forth in such formulae may be widely varied. For example in lieu of bees wax, I may employ suitable proportions of other substances, such as spermaceti, for example, although bees wax is preferred. The tri-hydroxyethylamine stearate which, as previously stated, functions as an emulsifying agent, may be replaced by other emulsifying agents, such for example as tri-ethylamine admixed with stearic acid.

It is well known, as for example as set forth in the work entitled "Physical Chemistry for Medical Students" published by Longmans, Green & Co., in 1927, that "when two colloids of opposite electric charge are mixed, the charge of one is neutralized by the charge of the other; aggregation of the particles and flocculation or precipitation of the colloids then take place." Accordingly in the preparation of my improved product where the aqueous phase of the finished product is alkaline or, if colloidal, as in the case of a soap ingredient in such phase, possesses a negative charge of electricity, such as is the case in the typical example of creams and lotions herein set forth, the colloidal gold suspension should, when first introduced into the mixture, possess a negative charge of electricity to avoid aggregation and precipitation or flocculation of the colloids in the cream or lotion in the aqueous phase thereof.

Having thus described my invention, what I claim and desire to obtain by United States Letters Patent is:—

1. A toilet cream of the oil and water emulsion type, containing a small quantity of colloidal gold and an organic emulsifying agent homogeneously incorporated therein, said colloidal gold being in suspension in the aqueous phase of said emulsion.

2. A toilet cream comprising a homogeneous emulsion of the oil and water type containing colloidal gold, the water being present in the external phase thereof and, the gold being in suspension in the water phase of said emulsion.

3. A toilet cream, comprising a homogeneous emulsion of the oil and water type containing colloidal gold, the water being present in the internal phase thereof and, the gold being in suspension in the water phase of said emulsion.

THOMAS GOVETT.